(12) United States Patent
Ferlay et al.

(10) Patent No.: US 12,025,388 B2
(45) Date of Patent: Jul. 2, 2024

(54) HEAT EXCHANGER WITH SECUREMENT OF THE FASTENING AT THE HEADER CORNER

(71) Applicant: Valeo Systemes Thermiques, Le Mesnil Saint-Denis (FR)

(72) Inventors: Benjamin Ferlay, Unterfoehring (DE); Zoulikha Soukeur, Le Mesnil Saint Denis Cedex (FR); Nicolas Vallee, Le Mesnil Saint Denis (FR); Damian Gut, Skawina (PL)

(73) Assignee: VALEO SYSTEMES THERMIQUES, Le Mesnil Saint-Denis (FR)

( * ) Notice: Subject to any disclaimer, the term of this patent is extended or adjusted under 35 U.S.C. 154(b) by 312 days.

(21) Appl. No.: 17/509,975

(22) Filed: Oct. 25, 2021

(65) Prior Publication Data

US 2022/0042753 A1    Feb. 10, 2022

Related U.S. Application Data

(63) Continuation of application No. PCT/EP2020/060639, filed on Apr. 15, 2020.

(51) Int. Cl.
*F28F 9/02*    (2006.01)

(52) U.S. Cl.
CPC .......... *F28F 9/0246* (2013.01); *F28F 9/0226* (2013.01); *F28F 2225/08* (2013.01)

(58) Field of Classification Search
CPC ..... F28F 9/0246; F28F 9/0226; F28F 2225/08
USPC ........................................................ 165/175
See application file for complete search history.

(56) References Cited

U.S. PATENT DOCUMENTS

2008/0308263 A1    12/2008  Kolb
2016/0334174 A1*   11/2016  Somhorst .............. F28F 9/0226
2017/0363372 A1*   12/2017  Somhorst .................. F28F 9/14

FOREIGN PATENT DOCUMENTS

CN    202747839 U  *  2/2013  ............ F28F 9/0226
WO    2018/050977 A1    3/2018

OTHER PUBLICATIONS

International Search Report and Written Opinion issued in corresponding International Patent Application No. PCT/EP2020/060639, dated Jun. 15, 2020 (10 pages).

* cited by examiner

*Primary Examiner* — Mahmoud Gimie
(74) *Attorney, Agent, or Firm* — Seema M. Mehta

(57) ABSTRACT

A heat exchanger with a heat-exchange core in which a first fluid and a second fluid circulate, at least one header tank configured to duct the second fluid from or to the heat-exchange core. The header tank has at least a shoulder oriented toward the outside of said header tank, and at least one header tank corner. At least one fastening member for fastening the header tank is positioned at least partly at the periphery of the heat-exchange core and includes at least one peripheral groove delimited by a base wall and a lateral wall and in which the shoulder of the header tank is at least partially housed. Part of the corner portion faces an upper face of the shoulder opposite to the groove of the fastening member and at a non-zero distance from this upper face so that a space is left between the corner portion and the upper face of the shoulder.

9 Claims, 5 Drawing Sheets

[Fig. 1]
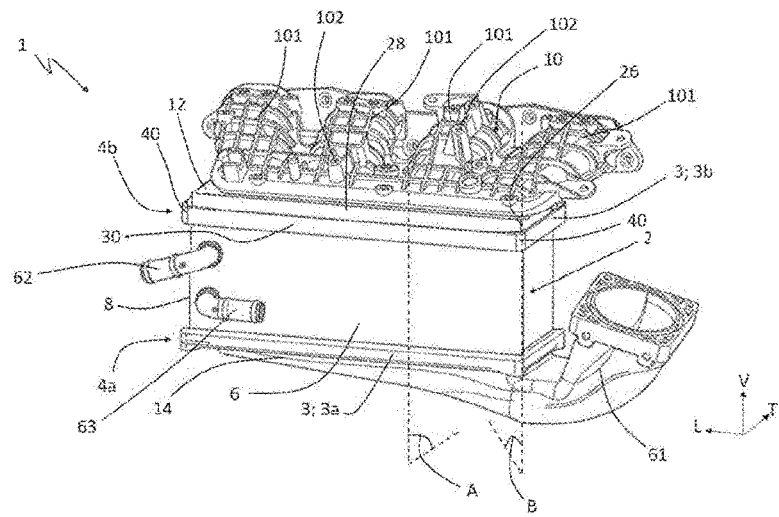
[Fig. 2]
--Prior Art--
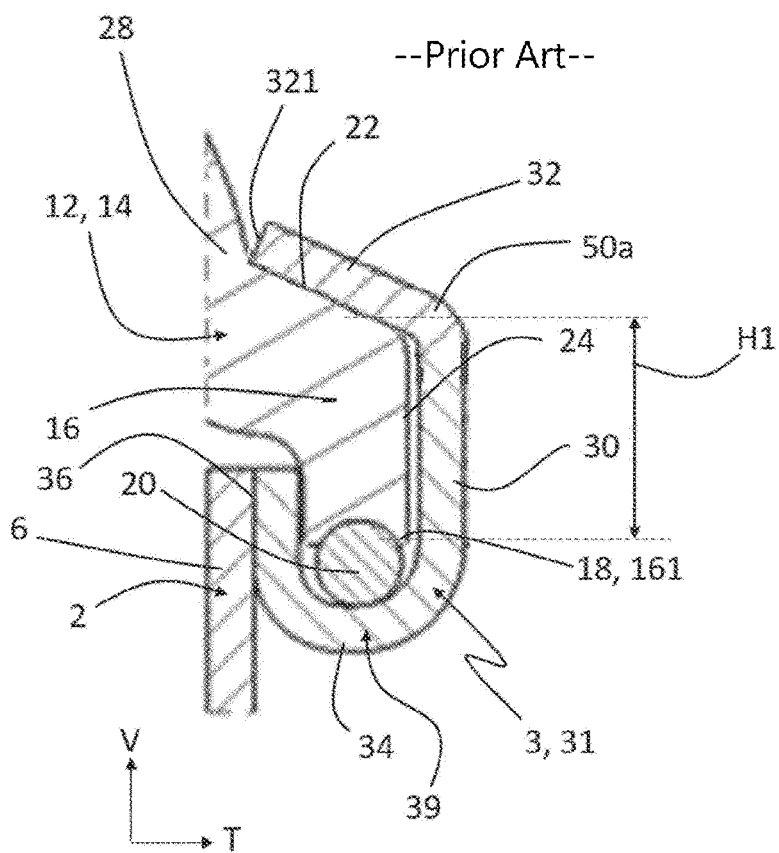

[Fig. 3]
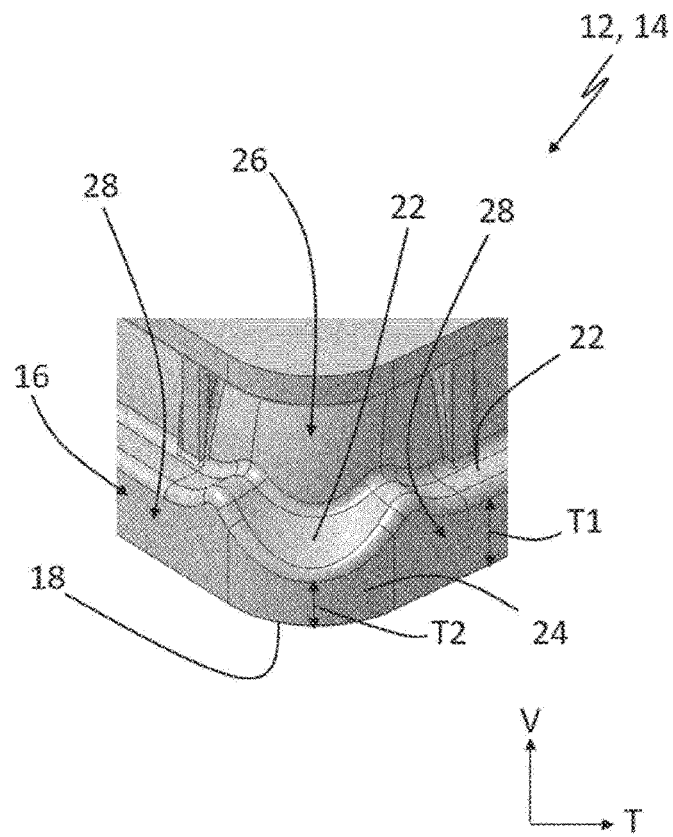
[Fig. 4]
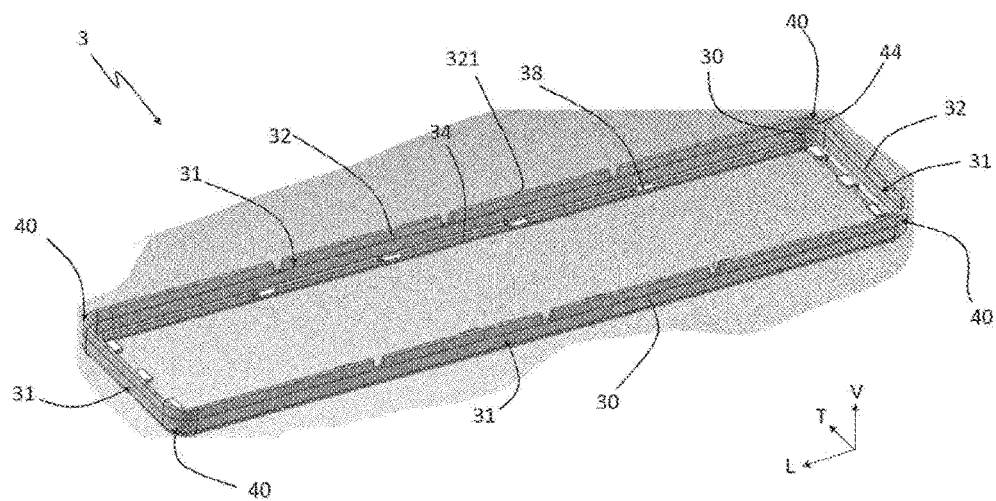

[Fig. 5]
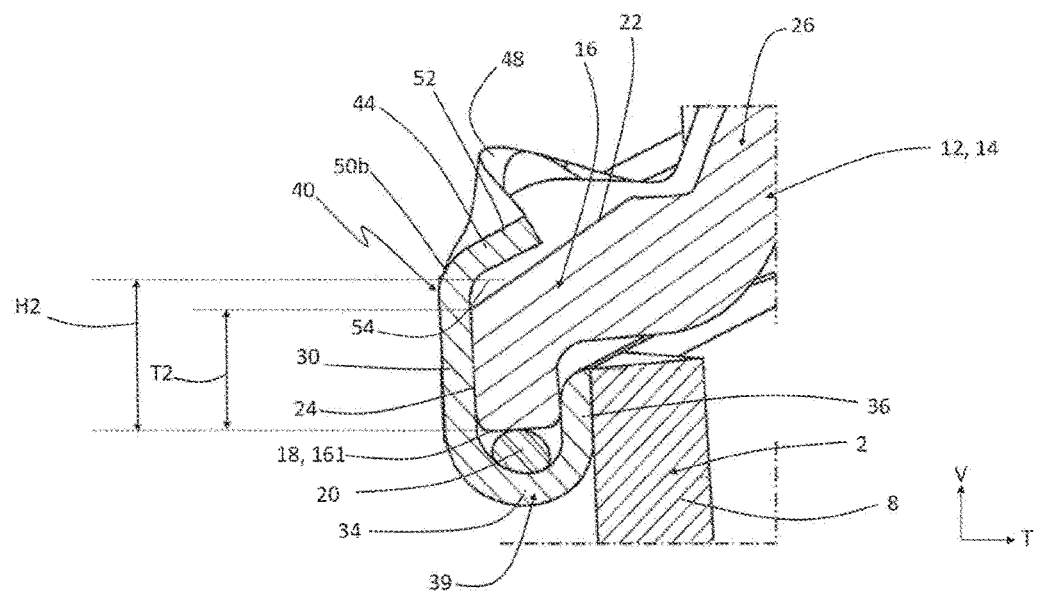
[Fig. 6]
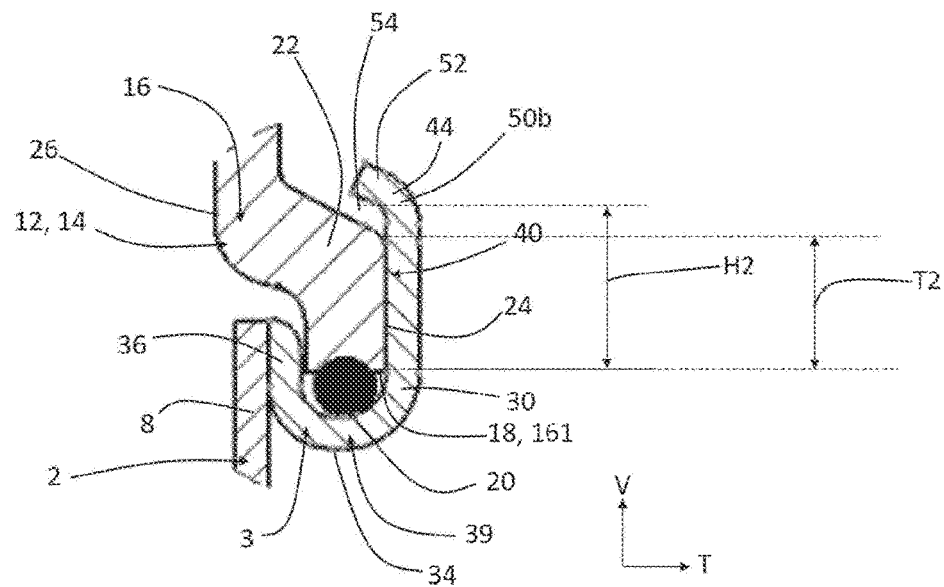

[Fig. 7]
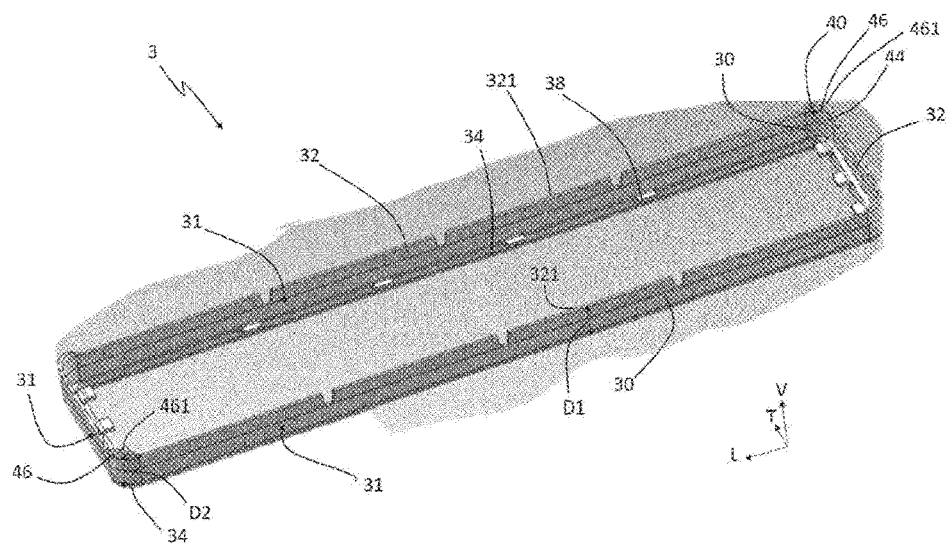
[Fig. 8]
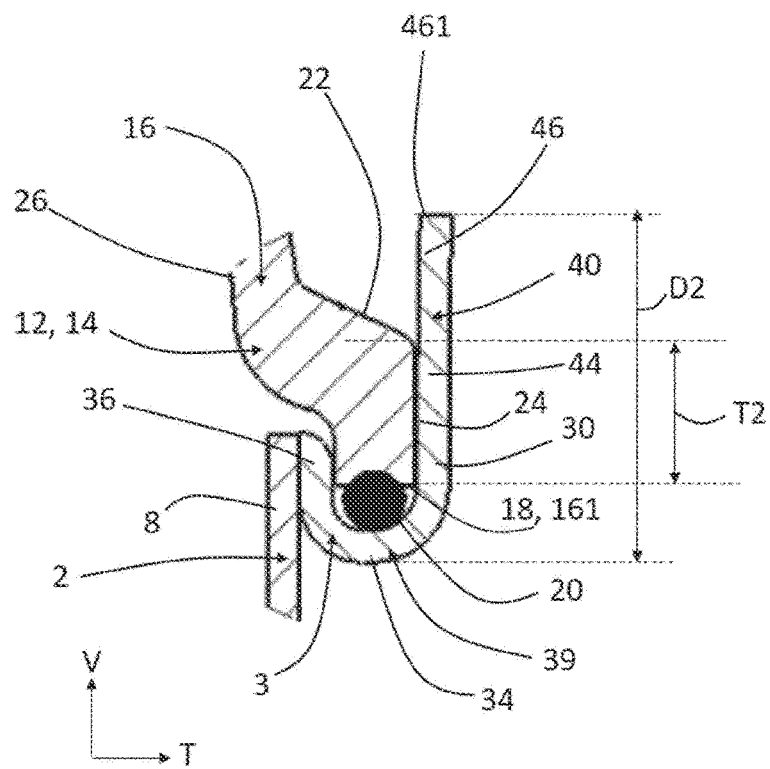

[Fig. 9]
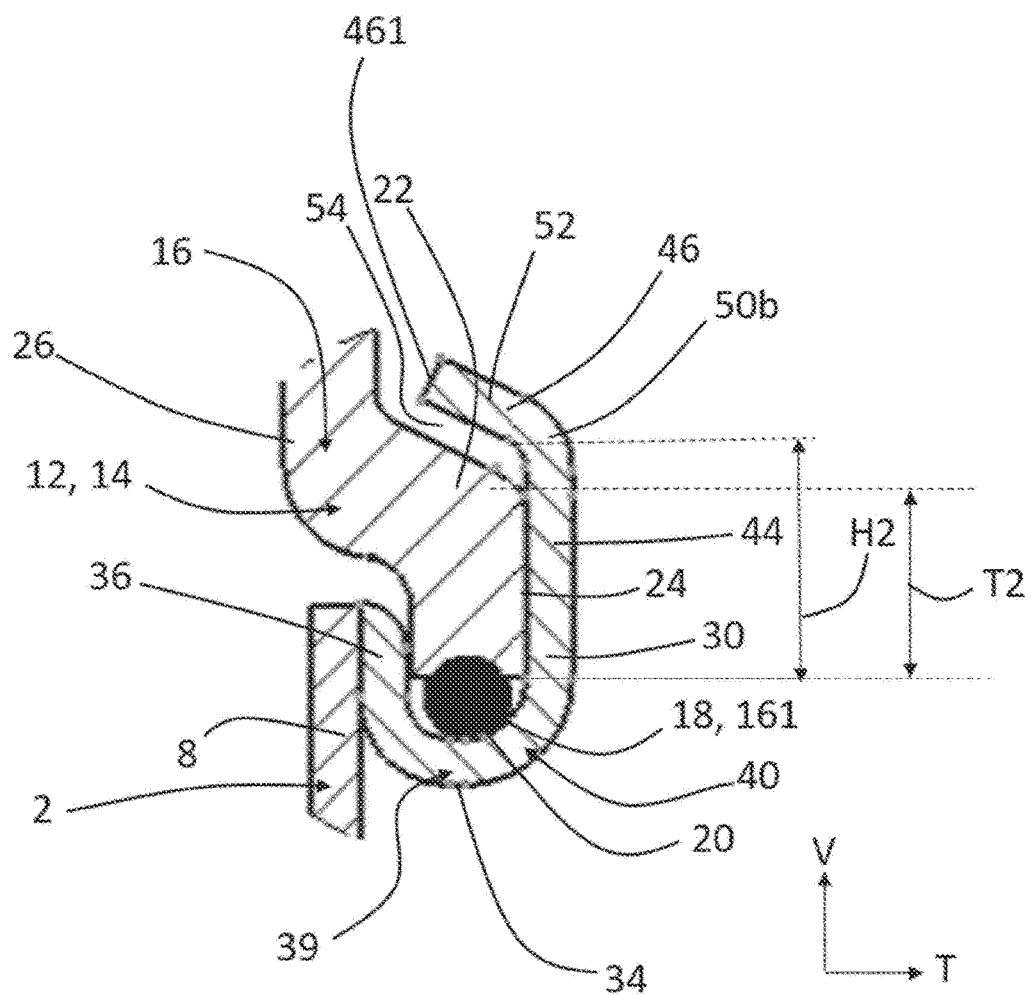

HEAT EXCHANGER WITH SECUREMENT OF THE FASTENING AT THE HEADER CORNER

The present invention relates to the field of heat exchangers and more particularly of the fixing-together of a heat-exchange core and an inlet and/or outlet header tank for a fluid that passes through the heat-exchange core.

BACKGROUND

A heat exchanger, such as a charge air cooler for example, generally comprises a heat-exchange core comprising tubes or a collection of plates inside which a first heat-transfer fluid circulates. The heat exchanger also comprises inlet or outlet header tanks for a second heat-transfer fluid, in this instance the supercharged charge air coming from a turbocharger. The inlet or outlet header tanks are fixed to the heat-exchange core in such a way that the second heat-transfer fluid circulates between the tubes or the plates and is able to exchange heat energy with the first heat-transfer fluid.

During the process of manufacturing the heat exchanger, the header tanks are generally fixed to the heat-exchange core using a fastening member. This fastening member may comprise a metal edge which extends around the periphery of the heat-exchange core and which comprises an upper wall which is folded over onto the header tank by crimping tools.

Nevertheless, the applicant has observed that the repeated pressure cycles to which the heat-exchange core is subjected by the force of the air from the turbocharger may cause the header tank to distend and may damage the upper wall, and particularly the wall near the corners of the heat-exchange core. This pressure exerted on the heat-exchange core may ultimately lead to breakage of part of the upper wall near the corners, weaken the fixing of the inlet or outlet header tank to the heat-exchange core and therefore give rise to leaks.

It is therefore an object of the present invention to overcome the above-mentioned disadvantage by conceiving of a means for securing the retention of the inlet or outlet header tank in the event of breakage of an upper wall near a header tank corner.

SUMMARY OF THE INVENTION

The present invention therefore relates to a heat exchanger comprising:
- a heat-exchange core in which a first fluid and a second fluid circulate;
- at least one header tank configured to duct the second fluid from or to the heat-exchange core, said header tank comprising at least a shoulder oriented toward the outside of said header tank, and the header tank comprising at least one header tank corner;
- at least one fastening member for fastening the header tank is positioned at least partly at the periphery of the heat-exchange core and comprises at least one peripheral groove delimited by a base wall and a lateral wall and in which the shoulder of the header tank is at least partially housed, the fastening member comprising:
  - a rectilinear portion of which the lateral wall is in part extended by at least one upper wall in contact with the shoulder of the header tank;
  - at least one corner portion facing the corner of the header tank;

characterized in that part of the corner portion faces an upper face of the shoulder opposite to the groove of the fastening member and at a non-zero distance from this upper face so that a space is left between the corner portion and the upper face of the shoulder.

The heat exchanger is a device allowing exchanges of heat energy between two fluids without the fluids mixing. In the context of the invention, this heat exchanger may, for example, be a charge air cooler, the purpose of which is to cool the air coming from the turbocharger before it is admitted into an internal combustion engine. However, the invention is not limited to this type of exchanger alone. The heat exchanger therefore comprises an inlet header tank directing the air leaving the turbocharger toward the heat-exchange core, and an outlet header tank directing the air leaving the heat-exchange core toward the internal combustion engine. In order to secure the inlet and outlet header tanks to the heat-exchange core, the fastening member is arranged around the periphery of the heat-exchange core so that a lateral wall of the fastening member follows the contour of the heat-exchange core.

The fastening member then comprises an upper wall, notably formed as a tooth, which extends the lateral wall on a rectilinear portion and allows the header tank to be crimped to the heat-exchange core.

The lateral wall of the corner portion is advantageously extended by a corner wall. The corner wall then extends in the continuation of the upper wall of the lateral wall of the rectilinear portion. Stated differently, the corner wall extends between two upper walls so that it connects these.

In order to make the fixing of the header tank more secure in the event of deformation or breakage of an upper wall, the corner portion of the fixing member is crimped to the shoulder of the corner of the header tank so that part of the corner portion faces the upper face of the shoulder. More specifically, the corner wall of the corner portion faces the upper face of the shoulder once the corner portion has been crimped. Stated differently, the corner portion acts as a securing member making the retention of the header tank against the heat-exchange core more secure in the event of deformation or breakage of an adjacent upper wall, which is to say of a crimping tooth situated on the rectilinear flanks of the fastening member. In particular, the corner portion prevents a crack from starting at the corners, which crack could then spread throughout the fastening member.

The space left between the corner portion and the upper face of the shoulder thus makes it possible to avoid or at the very least reduce the mechanical stresses on the corner portion, and notably on the corner wall, so that the latter is not weakened upstream in the event of deformation or breakage of an adjacent upper wall. It also makes it possible to avoid initiating stresses that could lead to deformation and/or breakage in the rest of the fastening member.

According to one feature of the invention, the part of the corner portion that is situated facing the upper face of the shoulder is an abutment against the upper face in the event of deformation of the upper wall of the lateral wall. Stated differently, in the event of breakage or deformation of an upper wall adjacent to the corner portion, the corner portion facing the upper face is able to retain the corner of the header tank on the heat-exchange core and/or avoid the initiation of stresses that could lead to cracks and/or uncrimping.

According to one feature of the invention, the rectilinear portion of the fastening member comprises a crimping bend situated at a first height from a free end of the shoulder, the corner portion comprising a crimping corner edge situated at a second height from the free end of the shoulder.

The first height and the second height are measured along a straight line parallel to a vertical direction of the heat exchanger. It will be appreciated that the first height and the second height are thus measured along straight lines that are parallel to one another.

According to one feature of the invention, the header tank comprises at least one lateral edge and the header tank corner, the lateral edge of the shoulder being defined by a first thickness measured between the free end of the shoulder and the upper face of the shoulder, the header tank corner being defined by a second thickness, measured parallel to the first thickness, between the free end of the shoulder and the upper face of the shoulder, the second thickness being strictly less than the first thickness.

The first thickness and the second thickness are measured along straight lines parallel to the vertical direction of the heat exchanger. Also, the thicknesses are preferably measured along a contact face of the shoulder. The contact face of the shoulder notably corresponds to the face on which the lateral wall of the fastening member is positioned.

Because the thickness of the header tank corner is less than that of the lateral edge, it will be appreciated that a space is left between the corner wall and the upper face of the shoulder, the space corresponding to the difference in thickness between the lateral edge and the corner of the header tank.

According to one feature of the invention, the first height of the crimping bend is strictly less than the second height of the crimping corner edge.

This feature makes it possible to generate the space between the corner wall and the upper face of the shoulder. In particular, this feature can be considered alone, or in combination with the previous feature regarding the thickness of the lateral edge and of the corner of the header tank. Specifically, the second thickness of the corner of the header tank being less than the first thickness of the lateral edge of the shoulder, in combination with a bend second height greater than the bend first height, makes it possible to generate a larger space than if the above-mentioned features were considered independently of one another.

Alternatively, the first height of the crimping bend is equal to the second height of the crimping corner edge.

It will be appreciated that this feature makes it possible to generate the space between the corner wall and the upper face only if it is considered in combination with the feature, mentioned hereinabove, relating to the second thickness of the corner of the header tank being less than the first thickness of the lateral edge of the shoulder.

According to one feature of the invention, the corner portion comprises a fold-over wall, the rectilinear portion of the fastening member extending over a first distance measured between the base wall and a free end of the upper wall of the lateral wall, the corner portion extending over a second distance measured parallel to the first distance between the base wall and a free end of the fold-over wall of the corner portion, the second distance being strictly greater than the first distance.

Advantageously, the first distance and the second distance are measured along a straight line parallel to the vertical direction of the heat exchanger. The fold-over wall extends parallel from the corner wall and notably contributes to ensuring that the second distance of the corner portion is greater than the first distance of the rectilinear portion.

It is appropriate to consider this feature of the invention in combination with the aforementioned feature regarding the second height of the crimping corner edge being greater than the first height of the crimping bend. These two features combined notably make it possible to generate the space between the upper face of the shoulder and the corner portion and, more specifically, with the fold-over wall.

Alternatively, this feature of the invention may be considered in combination with the previous feature whereby the second thickness of the corner of the header tank is less than the first thickness of the lateral edge of the shoulder and the first height of the crimping bend is equal to the second height of the crimping corner edge. These three features make it possible to generate the space between the upper face of the shoulder and the corner portion and, notably for this combination, the corner wall.

The advantage common to all of the combinations of these features is notably that the fold-over wall is able to create a larger area of corner portion facing the upper face of the shoulder. Thus, the fold-over wall offers a larger area of abutment against the upper face of the shoulder in the event of deformation of the upper wall of the lateral wall.

According to one feature of the invention, the corner portion comprises at least one deformed portion created in line with and at a non-zero distance from the upper face of the shoulder, as well as at least one wing adjacent to the deformed portion.

The deformed portion may for example be created by crimping, using a hammer and a punch, or using a press. The wing then corresponds to a portion immediately adjacent to the deformed portion, which is raised. Stated differently, the wing corresponds to a part of the corner portion which has not been crimped onto the upper face of the shoulder.

According to one feature of the invention, the fastening member is brazed to the periphery of the heat-exchange core. More specifically, a groove wall of the fastening member may be brazed to the periphery of the heat-exchange core. Brazing notably yields a firm fixing of the fastening member to the heat-exchange core, which is necessary for optimal retention of the header tank on the heat-exchange core.

According to one feature of the invention, the fastening member may comprise a header plate provided with slots onto which the tubes of the heat-exchange core open.

BRIEF DESCRIPTION OF THE DRAWINGS

Further features, details and advantages of the invention will become more clearly apparent from reading the following description, and also from a number of exemplary embodiments given by way of nonlimiting indication, with reference to the appended schematic drawings, in which:

FIG. 1 is a perspective general-arrangement view of a heat exchanger according to the invention;

FIG. 2 is a view in section on a first plane A of the fastening member clamped onto a shoulder of a lateral edge of an inlet or outlet header tank of the heat exchanger;

FIG. 3 is a close-up view of a header tank corner of one of the header tanks of the heat exchanger;

FIG. 4 is a perspective general-arrangement view of a fastening member according to a first embodiment of the invention;

FIG. 5 is a view in section on a second plane B of the fastening member of FIG. 4 positioned on the header tank corner of FIG. 3;

FIG. 6 is a view in section on the second plane B of the crimping of the fastening member of FIG. 4 according to a second embodiment of the invention;

FIG. 7 is a perspective view of a fastening member according to a third embodiment of the invention;

FIG. 8 is a view in section on the second plane B of the fastening member of FIG. 7 positioned on the header tank corner of one of the header tanks, before crimping;

FIG. 9 is a view in section on the second plane B of the fastening member of FIG. 7 positioned on the header tank corner of one of the header tanks, after crimping.

DETAILED DESCRIPTION

The features, variants and different embodiments of the invention may be combined with one another, in various combinations, as long as they are not mutually incompatible or mutually exclusive. It will be possible, in particular, to imagine variants of the invention that comprise only a selection of the features described below, in isolation from the other features described, if this selection of features is sufficient to confer a technical advantage or to distinguish the invention from the prior art.

FIG. 1 illustrates a heat exchanger 1 comprising the invention. The heat exchanger 1, in this instance a charge air cooler, is made up of a heat-exchange core 2, of an intake manifold 10, and of at least one fastening member 3. The heat-exchange core 2 is made up of a peripheral wall 6 adopting the shape of a quadrilateral and therefore comprising four exchanger-core corners 8. The heat-exchange core 2 comprises several tubes or a collection of plates (which are not visible) in which a first heat-transfer fluid circulates between an inlet duct 62 and an outlet duct 63 for said first heat-exchange fluid, in this instance a liquid.

The heat exchanger 1 also comprises an inlet header tank 14 and an outlet header tank 12 for a second heat-transfer fluid, for example a flow of supercharged air.

The inlet header tank 14 is positioned on a first face 4a of the heat-exchange core 2. The outlet header tank 12 is positioned on a second face 4b of the heat-exchange core 2, an opposite face to the first face 4a of the heat-exchange core 2 along a vertical direction V of the heat exchanger 1. The inlet header tank 14 and the outlet header tank 12 have a quadrilateral shape with four lateral edges 28 facing the peripheral wall 6 of the heat-exchange core 2. The inlet header tank 14 and the outlet header tank 12 also comprise four header tank corners 26 positioned facing the four exchanger-core corners 8 of the heat-exchange core 2.

An inlet pipe 61 is connected to the inlet header tank 14 to direct the air toward this same inlet header tank 14. On the opposite side from the inlet header tank 14, in the vertical direction V of the heat exchanger 1, the intake manifold 10 is positioned to cover the outlet header tank 12. The intake manifold 10 has the function of distributing the flow of air toward the combustion chambers of the internal combustion engine, by means of four inlet ducts 101. The intake manifold 10 also comprises fixing interfaces 102, allowing it to be secured to the engine of the motor vehicle or to bear other components. The outlet header tank 12 and the intake manifold 10 may take the form of two distinct components or else may form one and the same single component.

A first fastening member 3a is arranged around the periphery of the first face 4a of the heat-exchange core 2 so that it follows the contour of the peripheral wall 6 and of the exchanger-core corners 8 of the heat-exchange core 2. In the same way, a second fastening member 3b is arranged around the periphery of the second face 4b of the heat-exchange core 2 so that it follows the contour of the peripheral wall 6 and of the exchanger-core corners 8 of the heat-exchange core 2. The first fastening member 3a and the second fastening member 3b have the purpose of respectively holding the inlet header tank 14 and the outlet header tank 12 on the heat-exchange core 2, notably when a stream of air is passing through it.

In the remainder of the description, the first fastening member 3a and the second fastening member 3b will be grouped together under the term of fastening member 3 when the features being explained are common to both. The inlet header tank 14 and the outlet header tank 12 will likewise be grouped together under the term of header tank 12, 14 when the features being described apply without preference to either one or the other of the header tanks 12, 14.

FIG. 2 illustrates a view in section on a first plane A, visible in FIG. 1, of the fastening member 3 arranged along the peripheral wall 6 of the heat-exchange core 2 and along one of the lateral edges 28 of the header tank 12, 14.

The header tank 12, 14 of the heat-exchange core 2 comprises a shoulder 16 oriented toward the outside of said header tank 12, 14. The shoulder 16 therefore comprises a free end 161 on the outside of the header tank 12, 14, forming a bearing zone 18. The shoulder 16 also comprises an upper face 22, opposite to the bearing zone 18 in the vertical direction V of the heat exchanger 1. Between the bearing zone 18 and the upper face 22 a contact face 24 extends in the vertical direction V of the heat exchanger 1 and is directed toward the outside of the header tank 12, 14.

The fastening member 3 is therefore positioned along the periphery of the heat-exchange core 2 such that it clamps the shoulder 16 of the header tank 12, 14 at the lateral edges 28.

The fastening member 3 comprises a lateral wall 30 facing the contact face 24. The lateral wall 30 is therefore extended, on the one hand, by a base wall 34 followed by a groove wall 36, such that these walls form a groove 39 around the bearing zone 18 of the shoulder 16. The base wall 34 is thus the wall in line with the bearing zone 18, while the groove wall 36 is the wall extending between the shoulder 16 and the heat-exchange core 2. The groove wall 36 may then be secured to the heat-exchange core 2, notably by welding or brazing.

The lateral wall 30 is extended, on the other hand, by at least one upper wall 32, positioned such that it is in contact with the upper face 22 of the shoulder 16. The crimping of the upper wall 32 forms a first bend 50a, corresponding to a curvature between the lateral wall 30 and the upper wall 32. There is then defined a first height H1, measured from the free end 161 of the shoulder 16 along a straight line parallel to the peripheral wall 6 of the heat-exchange core 2, and corresponding to the height of the first bend 50a of the upper wall 32 of the rectilinear portion 31.

According to the invention, the first height H1 of the first bend 50a of the upper wall 32 allows the latter to be in contact with the upper face 22 of the shoulder 16. Such contact notably offers optimal retention of the header tank 12, 14 on the heat-exchange core 2.

A gasket 20 may be housed between the bearing zone 18 and the base wall 34.

The gasket 20 provides sealing of the fixing of the header tank 12, 14 against the heat-exchange core 2. When the header tank 12, 14 is fixed in the heat-exchange core 2, the gasket 20 is compressed between the bearing zone 18 and the base wall 34. According to one exemplary embodiment which has not been illustrated, the gasket 20 may be incorporated directly into the bearing zone 18 of the shoulder 16.

It will be appreciated from these foregoing features that the fastening member 3 is clamped around the shoulder 16 of the lateral edges 28 of the header tank 12, 14. When a stream of air reaches the heat exchanger, the header tank 12, 14 may be shifted vertically toward the outside of the heat-exchange core 2. It has therefore been noticed that the shifting of the header tank 12, 14, brought about as a result of the pressure from the turbocompressor, caused a concentration of mechanical stresses on the fastening member 3, notably at the header tank corners. This concentration of stresses may ultimately weaken or even deform the upper walls 32 positioned on either side of the header tank corners. The system for making the header tank corners more secure has therefore been developed by the applicant, and will be set forth in the remainder of the detailed description, according to three embodiments.

It should therefore be considered that all of the features of the rectilinear portion 31 which were set out in FIG. 2, and notably the contact between the upper wall 32 and the upper face 22 of the shoulder 16, apply to all of the embodiments set forth hereinafter.

FIG. 3, FIG. 4 and FIG. 5 will be described jointly in order to set forth a first embodiment of the invention. FIG. 3 illustrates a close-up view of one of the header-tank corners 26 of the header tank 12, 14. FIG. 4 illustrates the fastening member 3 according to a first embodiment and before it is crimped onto the shoulder 16 of the header tank 12, 14. FIG. 5 is a view in section on a second plane B, visible in FIG. 1, of the assembling of the fastening member 3 of FIG. 4 on the header tank corner 26 of the header tank 12, 14 of FIG. 3.

The lateral edge 28 of the shoulder 16 of the header tank 12, 14 has a first thickness T1, measured along a straight line parallel to a vertical direction V of the heat exchanger and along the contact face 24, between the free end 161 of the shoulder 16 and its upper face 22.

According to one feature of the first embodiment of the invention, the header-tank corner 26 of the header tank 12, 14 has a second thickness T2, measured along a straight line parallel to the vertical direction V of the heat exchanger and along the contact face 24, between the free end 161 of the shoulder 16 and its upper face 22. According to one feature of this first embodiment of the invention, the second thickness T2 is strictly less than the first thickness T1 of the lateral edge 28 of the shoulder 16.

The fastening member 3, notably visible in FIG. 4, has the shape of a quadrilateral defined by the lateral wall 30. The fastening member 3 therefore comprises four rectilinear portions 31 and four corners, that will be referred to as corner portions 40. It will therefore be appreciated that the four corner portions 40 conform to the shape of the exchanger-core corners 8 of the heat-exchange core 2 and the header tank corners 26 of the header tank 12, 14.

At least at one of the corner portions 40, the lateral wall 30 is extended by a corner wall 44. The corner wall 44 therefore extends parallel to and starting from the lateral wall 30 of the corner portion 40. It also constitutes a continuation of two upper walls 32 which are positioned one on each side of the corner portion 40 so that it connects these walls.

The fastening member 3 may advantageously comprise teeth 38 which extend from the base wall 34 of the fastening member 3. The purpose of the teeth 38 is to strengthen the connection between the fastening member 3 and at least the peripheral wall 6.

Once positioned around the shoulder 16 of the header tank 12, 14, the corner wall 44 is crimped onto the upper face 22 of the shoulder 16 of the header-tank corners 26, as visible in FIG. 5.

The crimping of the corner wall 44 then forms a deformed portion 52, corresponding to the zone in which the mechanical pressure for the crimping has been applied. The crimping of the corner wall 44 then forms a crimping corner edge 50b formed at a second height H2. The second height H2 is measured from the free end 161 of the shoulder 16 along a straight line parallel to the peripheral wall 6 of the heat-exchange core 2, and corresponding to the height of the crimping corner edge 50b of the corner wall 44 of the corner portion 40.

According to one feature of the first embodiment of the invention, the first height of the upper wall 32, detailed in FIG. 2, and the second height H2 of the corner wall 44 are identical. It will therefore be appreciated that the crimping of the upper wall 32 and of the corner wall 44 in this embodiment is performed to the one same height.

According to the first embodiment of the invention, the deformed portion 52 is at a non-zero distance away from the upper face 22 so that it generates a space 54 between the deformed portion 52 and the upper face 22. It will therefore be appreciated that this space 54 is generated by virtue of the fact that the second thickness T2 of the header-tank corner 26 is less than the first thickness T1 of the lateral edge 28 of the shoulder 16, because the first height of the crimping bend and the second height H2 of the crimping corner edge 50b are identical over the entirety of the fastening member 3.

The crimping of the corner wall 44 forms, on either side of the deformed portion 52, at least one wing 48. This wing 48 corresponds to a portion immediately adjacent to the deformed portion 52, and which is raised. It will be appreciated that the wing 48 is brought about by the non-rectilinear shape of the header tank corner 26, which prevents the corner wall 44 from being folded over completely onto the shoulder 16. In the example illustrated, two wings 48 are created, one on each side of the deformed portion 52.

During use of the heat exchanger, the pressure exerted by the stream circulating in the header tank 12, 14 carries the risk of lifting this tank. The crimping of the corner wall 44 makes the retention of the header tank 12, 14, on the heat-exchange core 2 more secure in the event of deformation or breakage of an upper wall 32 adjacent to the header tank corner 26, notably by acting as an abutment. It will therefore be appreciated that, in such a case, the space 54 would disappear because the upper face 22 would come into abutment against the deformed portion 52.

A second embodiment of the fastening member 3 will now be described in connection with FIG. 6. It should be considered that only the features that differ between the fastening member 3 of the first embodiment and that of the second embodiment will be described in the remainder of the description. In the case of the features that are identical, reference should be made to FIGS. 3 to 5. Likewise, the features of the rectilinear portion which were set forth in FIG. 2 apply to this second embodiment of the fastening member 3.

FIG. 6 is a view in section on the second plane B, visible in FIG. 1, of the second embodiment of the invention. One difference compared with the first embodiment of the invention set forth hereinabove lies in the fact that the second thickness T2 of the header-tank corner 26 is identical to the first thickness of the lateral edge of the shoulder of the header tank 12, 14. Likewise, in this second embodiment, the fastening member 3 is identical to the fastening member 3 of the first embodiment and visible in FIG. 4.

The corner wall 44 is therefore crimped onto the shoulder 16 of the header tank 12, 14 and forms the deformed portion 52 positioned a non-zero distance away from the upper face 22 of the shoulder 16 of the header tank corner 26. The crimping of the corner wall 44 then forms the crimping corner edge 50b at the second height H2. The bend second height H2 in this second embodiment is strictly greater than the first height of the crimping bend of the upper wall. This feature makes it possible to create the space 54 because the thickness of the shoulder 16 is constant over the entirety of the header tank 12, 14.

A third embodiment of the invention will now be described in connection with FIG. 7. FIG. 8 and FIG. 9 show views in section on the second plane B, visible in FIG. 1, of the fastening member 3 of FIG. 7, respectively before and after it is crimped onto the shoulder 16 of the corner 26 of the header tank 12, 14. As with the second embodiment, the features of the rectilinear portion which were set forth in FIG. 2 apply to this third embodiment of the fastening member 3.

The fastening member 3 of FIG. 7 has the features of the fastening member set forth in FIG. 4, and also a fold-over wall 46. The fold-over wall 46 of the third embodiment of the invention runs parallel from the corner wall 44 of the corner portion 40 of the fastening member 3. In the example illustrated in FIG. 7, the fastening member 3 comprises four fold-over walls 46 on its four corner portions 40.

A second distance D2, corresponding to the distance over which the corner portion 40 extends, measured along a straight line parallel to the vertical direction V of the heat exchanger, from the base wall 34 and as far as a free end 461 of the fold-over wall 46 is defined. A first distance D1, corresponding to the distance over which the rectilinear portions 31 of the fastening member 3 extend, measured along a straight line parallel to the vertical direction V of the heat exchanger, from the base wall 34 and as far as a free end 321 of one of the upper walls 32 is defined. Thus, according to one feature of this third embodiment, the second distance D2 is strictly greater than the first distance D1. It will therefore be appreciated that the fold-over wall 46 makes it possible to generate the second distance D2 that is greater than the first distance D1.

Still according to this third embodiment, and according to a feature identical to the second embodiment, the first thickness of the lateral edge of the shoulder 16 and the second thickness T2 of the header-tank corner 26 are identical.

Once the fastening member 3 has been positioned on the periphery of the heat exchange core 2, as visible in FIG. 8, the corner wall 44 can be at least partially in contact with the contact face 24 of the shoulder 16. The fold-over wall 46 is, at least in part, free of any contact with the shoulder 16 of the header tank 12, 14.

Once the fastening member 3 has been positioned on the shoulder 16 of the header tank 12, 14, the fold-over wall 46 is crimped onto the shoulder 16 of the header tank corner 26 of the header tank 12, 14 and forms the deformed portion visible in FIG. 9. The crimping also forms the crimping corner edge 50b positioned at the second height H2.

According to one feature of this third embodiment of the invention, and as with the second embodiment, the second height H2 is strictly greater than the first height of the crimping bend of the upper wall of the fastening member 3.

According to the same feature as in the previous embodiments, the deformed portion 52 faces and is at a non-zero distance from the upper face 22 of the shoulder 16, so as to leave a space 54. Thus, the space 54 is created as in the second embodiment, by virtue of the fact that the second height H2 is greater than the first height of the upper wall.

One advantage of the third embodiment over the second embodiment is that it offers a larger area of deformed portion 52 facing the shoulder 16. Specifically, the crimping corner edge 50b is positioned at the second height H2, which is greater than the first height H1, but the fold-over wall 46 of the corner portion makes it possible, unlike in the second embodiment, to maintain a greater area of deformed portion 42, and therefore of abutment against the shoulder. This greater area of abutment increases the mechanical strength of the header tank 12, 14 in the event of deformation or breakage of one of the adjacent upper walls.

Of course, the invention is not limited to the example that has just been described, and numerous modifications can be made to this example without departing from the scope of the invention. In particular, the three embodiments described may be combined, so long as these combinations generate the space between the upper face of the shoulder and the deformed portion of the corner portion.

The invention as has just been described clearly does achieve its set objective and offers a means of making the fixing of the inlet header tank and/or the outlet header tank to the heat exchange core more secure, notably at the header tank corners. Variants which are not described here may be implemented without departing from the context of the invention, provided that, in accordance with the invention, they comprise a securing device according to the aspect of the invention.

What is claimed is:

1. A heat exchanger comprising:
   a heat-exchange core in which a first fluid and a second fluid circulate;
   at least one header tank configured to duct the second fluid from or to the heat-exchange core, said header tank comprising at least a shoulder oriented toward the outside of said header tank, and the header tank comprising at least one header tank corner;
   at least one fastening member for fastening the header tank is positioned at least partly at the periphery of the heat-exchange core and comprises at least one peripheral groove delimited by a base wall and a lateral wall and in which the shoulder of the header tank is at least partially housed,
   the fastening member comprising:
     a rectilinear portion of which the lateral wall is in part extended by at least one upper wall in contact with the shoulder of the header tank;
     at least one corner portion facing the corner of the header tank,
     wherein the at least one corner portion of the fastening member is arranged to fasten to a corresponding header tank corner, and
     wherein part of the corner portion faces an upper face of the shoulder opposite to the groove of the fastening member and at a non-zero distance from this upper face so that a space is left between the corner portion and the upper face of the shoulder.

2. The heat exchanger as claimed in claim 1, wherein the part of the corner portion that is situated facing the upper face of the shoulder is an abutment against the upper face in the event of deformation of the upper wall of the lateral wall.

3. The heat exchanger as claimed in claim 1, wherein the rectilinear portion of the fastening member comprises a crimping bend situated at a first height from a free end of the shoulder, the corner portion comprising a crimping corner edge situated at a second height from the free end of the shoulder.

4. The heat exchanger as claimed in claim 1, the header tank comprises at least one lateral edge and the header tank corner, the lateral edge of the shoulder being defined by a first thickness measured between the free end of the shoulder and the upper face of the shoulder, the header tank corner being defined by a second thickness, measured parallel to the first thickness, between the free end of the shoulder and the upper face of the shoulder, the second thickness being strictly less than the first thickness.

5. The heat exchanger as claimed in claim 3, wherein the first height of the crimping bend is strictly less than the second height of the crimping corner edge.

6. The heat exchanger as claimed in claim 3, wherein the first height of the crimping bend is equal to the second height of the crimping corner edge.

7. The heat exchanger as claimed in claim 1, wherein the corner portion comprises a fold-over wall, the rectilinear portion of the fastening member extending over a first distance measured between the base wall and a free end of the upper wall of the lateral wall, the corner portion extending over a second distance measured parallel to the first distance between the base wall and a free end of the fold-over wall of the corner portion, the second distance being strictly greater than the first distance.

8. The heat exchanger as claimed in claim 1, wherein the corner portion comprises at least one deformed portion created in line with and a non-zero distance from the upper face of the shoulder, as well as at least one wing adjacent to the deformed portion.

9. The heat exchanger as claimed in claim 1, wherein the fastening member is brazed to the periphery of the heat-exchange core.

* * * * *